US009023146B2

(12) United States Patent
Carlson et al.

(10) Patent No.: US 9,023,146 B2
(45) Date of Patent: May 5, 2015

(54) OXIDIZING AGENTS ON PIGMENTS

(71) Applicant: Empire Technology Development LLC, Wilmington, DE (US)

(72) Inventors: William Brenden Carlson, Seattle, WA (US); Feng Wan, Issaquah, WA (US); Timothy Londergan, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 122 days.

(21) Appl. No.: 13/819,745

(22) PCT Filed: Sep. 25, 2012

(86) PCT No.: PCT/US2012/057025
§ 371 (c)(1),
(2) Date: Feb. 28, 2013

(87) PCT Pub. No.: WO2014/051538
PCT Pub. Date: Apr. 3, 2014

(65) Prior Publication Data
US 2014/0083323 A1    Mar. 27, 2014

(51) Int. Cl.
C09D 5/14 (2006.01)
C08K 3/00 (2006.01)
C09C 1/04 (2006.01)
C09C 1/22 (2006.01)
C09C 1/36 (2006.01)
C08K 9/04 (2006.01)

(52) U.S. Cl.
CPC ............... C09D 5/14 (2013.01); C08K 3/0033 (2013.01); C08K 9/04 (2013.01)

(58) Field of Classification Search
CPC ........... C09D 5/14; C08K 3/00; C08K 3/0033
See application file for complete search history.

(56) References Cited

U.S. PATENT DOCUMENTS

| 3,375,123 | A |   | 3/1968  | Krocker et al. |
|-----------|---|---|---------|----------------|
| 3,929,502 | A |   | 12/1975 | Hodgkin et al. |
| 4,839,402 | A |   | 6/1989  | Stevens |
| 5,503,669 | A | * | 4/1996  | Klima et al. ................... 106/243 |
| 5,698,205 | A |   | 12/1997 | Brückner et al. |
| 5,910,213 | A |   | 6/1999  | Ashdown et al. |
| 6,045,609 | A |   | 4/2000  | Guillaumon et al. |
| 7,863,369 | B2|   | 1/2011  | Bianchi et al. |
| 2003/0101909 | A1 |   | 6/2003 | Langenmayr et al. |
| 2005/0245586 | A1 |   | 11/2005 | Henriksson et al. |
| 2005/0271892 | A1 |   | 12/2005 | Ogata et al. |
| 2006/0089421 | A1 |   | 4/2006  | Vasudevan |

(Continued)

FOREIGN PATENT DOCUMENTS

WO    WO 97/20216 A1    6/1997

OTHER PUBLICATIONS

International Search Report and Written Opinion for PCT/US2012/057025 dated Jan. 18, 2013.

Primary Examiner — Pegah Parvini
(74) Attorney, Agent, or Firm — Pepper Hamilton LLP

(57) ABSTRACT

Hydrophilic self-cleaning coating compositions and methods to make and use the compositions are disclosed. The compositions include a pigment material made up of an inorganic pigment attached or linked to at least one oxidizing agent. In some embodiments, the oxidizing agent is an organic molecule covalently or non-covalently attached to the inorganic pigment. In some embodiments, the oxidizing agent is linked to the inorganic pigment by a linker moiety.

26 Claims, 5 Drawing Sheets

(56) References Cited

U.S. PATENT DOCUMENTS

| | | |
|---|---|---|
| 2007/0051275 A1 | 3/2007 | Muller et al. |
| 2007/0149570 A1 | 6/2007 | Ikeura et al. |
| 2008/0194754 A1* | 8/2008 | Nakamura et al. ............ 524/497 |
| 2008/0268189 A1* | 10/2008 | Sun et al. .................... 428/34.1 |
| 2009/0074825 A1 | 3/2009 | Sun et al. |
| 2010/0148135 A1* | 6/2010 | Yokoyama .................... 252/589 |
| 2012/0164199 A1 | 6/2012 | Lomasney et al. |

* cited by examiner $$TiO_2 + Light \longrightarrow TiO_2^*(e/p)$$

$$TiO_2^*(e/p) + O_2 \longrightarrow TiO_2(p) + O_2\cdot^-$$

$$TiO_2(p) + H_2O \longrightarrow TiO_2 + H^+ + HO\cdot$$

$$H^+ + O_2\cdot^- \longrightarrow HOO\cdot$$

$$2\,HOO\cdot \longrightarrow H_2O_2 + O_2$$

$$TiO_2^*(e/p) + H_2O_2 \longrightarrow TiO_2 + 2\,HO\cdot$$

(12) United States Patent

US 9,023,146 B2

OXIDIZING AGENTS ON PIGMENTS

CLAIM OF PRIORITY

This application is a U.S. national stage filing under 35 U.S.C. §371 of International Application No. PCT/US2012/057025 filed on Sep. 25, 2012 entitled "Oxidizing Agents on Pigments", which is incorporated herein by reference in its entirety.

BACKGROUND

Decorative coatings and paints are used by consumers and industrial users to beautify and protect substrates. The most simple coatings and paints are made of a polymer (the binder) in a solvent (the vehicle), which is commonly called a lacquer. Paints and coatings are used to modify the appearance of an object by adding color, gloss, or texture and by blending with or differentiating from a surrounding environment. For example, a surface that is highly light scattering (i.e. a flat surface) can be made glossy by the application of a paint that has a high gloss. Conversely, a glossy surface can be made to appear flat. Thus, the painted surface is hidden, altered, and ultimately changed in some manner by the presence of the coating. In addition, decorative paints protect the surface from the surrounding elements and reduce corrosion.

Although paints and coatings alter the appearance of the surface, the coating itself can get dirty. The dirt can dull the coating by increasing the light scattering or modifying the color. Many attempts to create organic coatings that resist dirt and contamination have been undertaken. In one case, hydrophobic coatings with a low surface energy that resist water and thus resistant to dirt have been created. For example, highly fluorinated polymers related to Teflon have been used for this purpose. These coatings often have a surface energy of 15 or less dynes, which results in water forming beads on the surface rather than wetting the surface. Generally, these coatings take more time to become contaminated and maintain the appearance of the object longer, but they still eventually need to be cleaned. Accordingly, there is a need to develop coatings that reduce or eliminate the amount of dirt that adheres to the surface, and are self-cleaning.

SUMMARY

The present disclosure is directed towards paints and coatings that provide a hydrophilic, self-cleaning surface when coated on an object. In one embodiment, a pigment composition may be at least one inorganic pigment attached or linked to at least one oxidizing agent.

In another embodiment, a method of preparing a pigment composition may involve contacting at least one inorganic pigment with at least one oxidizing agent to form a mixture, and heating the mixture to form the pigment composition.

In an additional embodiment, a composition for forming a hydrophilic and self-cleaning coating may include at least one inorganic pigment attached or linked to at least one oxidizing agent, and at least one binder component.

In a further embodiment, a method of providing a hydrophilic and self-cleaning surface to a substrate may be applying a coating composition to the substrate, wherein the coating composition comprises at least one inorganic pigment attached or linked to at least one oxidizing agent.

DETAILED DESCRIPTION

This disclosure is not limited to the particular systems, devices and methods described, as these may vary. The terminology used in the description is for the purpose of describing the particular versions or embodiments only, and is not intended to limit the scope.

Decorative coatings and paints are high-volume consumer products. As the name implies, the function of a decorative coating is to make an object look more visually appealing. However, in addition to accomplishing the beautification of an object, the coating must also afford some degree of substrate protection. As paints and coatings become covered and contaminated with unwanted substances, the appearance of the object often changes in undesirable ways. It is often expensive to clean the coated surface, and the detergents, surfactants, fragrances, alkali, lime, and/or other chemicals used to clean the surface make their way into the environment where they can potentially cause great damage. Thus, it is desirable to have a coating that reduce or eliminate the amount of dirt that adheres to the surface, and is self-cleaning.

Figure 1:
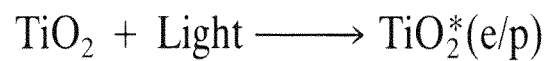
FIG. 1 shows the photocatalytic activity of titanium dioxide and production of free radicals according to an embodiment.
Figure 1:
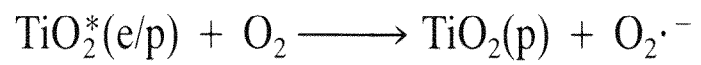
Figure 1:
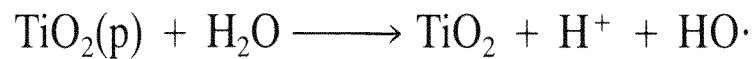
Figure 1:
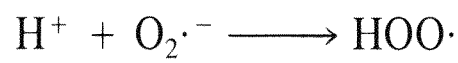
Figure 1:
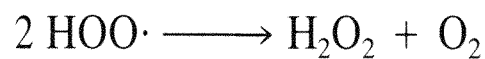
Figure 1:
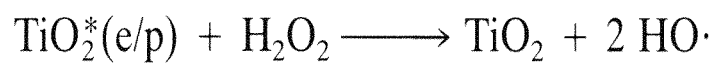

Many paints and coatings include a photocatalytic pigment material, such as titanium dioxide, in their composition. The photocatalytic properties of titanium dioxide result from the promotion of electrons from the valence band to the conduction band under the influence of ultraviolet (UV) and near-UV radiation. The reactive electron-hole pairs that are created migrate to the surface of the titanium dioxide particles where the holes oxidize adsorbed water to produce reactive hydroxyl radicals and the electrons reduce adsorbed oxygen to produce superoxide radicals, both of which can degrade nitrogen compounds and volatile organic compounds in the air (FIG. 1). In view of these properties, photocatalytic titanium dioxide has been employed in coatings and the like to remove pollutants from the air. Such coatings may also have the advantage of being self-cleaning since soil (grease, mildew, mold, algae, etc.) is also oxidized on the surface.

The present disclosure is directed towards paints and coatings that provide a hydrophilic, self-cleaning surface when coated on an object. In some embodiments, the pigment composition may be at least one inorganic pigment attached or linked to at least one oxidizing agent. The oxidizing agent may be an organic molecule attached covalently or non-covalently to the inorganic pigment. Examples of oxidizing agents include, but are not limited to, hydantoins, nitro compounds, nitroso compounds, triazines, oxazolidinones, imidazolidinones, N-halamines, and combinations thereof. Examples include N-methyl-malonamic acid, N-methyl-succinamic acid, (2,5-dioxo-pyrrolidin-3-yl)-acetic acid, 4-methylcarbamoyl-butyric acid, (2,6-dioxo-piperidin-4-yl)-acetic acid, (2,6-dioxo-hexahydro-pyrimidin-4-yl)-acetic acid and (2-oxo-piperidin-4-yl)-acetic acid. Further, the oxidizing agent may be a halogenated molecule. The function of the oxidizing agent is to oxidize any contaminant that comes into contact with the surface of the substrate, thus resulting in self-cleaning of the coating. The oxidizing agent may work in conjunction with the photocatalytic effect of the pigment to decompose any contaminant that comes into contact with the surface.

The inorganic pigments used in the coating may be photocatalytic pigments or non-photocatalytic pigments. Photocatalytic pigments, as explained above, have self-cleaning properties due to production of electron-hole pairs upon exposure to UV light. The photocatalytic pigment may be titanium dioxide, copper oxide, hematite, magnetite, wüstite, chromium oxide, tin dioxide, carbonate pigment, or any combination thereof. Titanium dioxide is produced in two crystal phases, rutile and anatase, that differ in lattice structures, refractive indices, and densities. The titanium dioxide used in the coatings may be a rutile titanium dioxide particle, an anatase titanium dioxide particle, or a mixture thereof. The titanium dioxide particles may have an average particle diameter of about 300 nanometers to about 1 micron, of about 300 nanometers to about 750 nanometers, or of about 300 nanometers to about 500 nanometers. Specific examples include about 300 nanometers, about 400 nanometers, about 500 nanometers, about 600 nanometers, about 750 nanometers, about 800 nanometers, about 900 nanometers, about 1 micron, and ranges between (and including the endpoints of) any two of these values. In some embodiments, a composition comprising a plurality of photocatalytic pigment particles, such as titanium dioxide, will have at least 50%, at least 60%, at least 70%, at least 80%, at least 90%, at least 95%, at least 96%, at least 97%, at least 98%, at least 99%, or at least 99.5% of the particles with the recited particle diameter or within the range of particle diameters.

The oxidizing agents may be attached to any inorganic pigment as described herein. Some of the non-limiting examples of the inorganic pigments include iron oxide black, iron oxide red, iron oxide yellow, ultramarine, cobalt blue, cerulean blue, cobalt stannate, calcium copper silicate, ferric hexacyanoferrate, barium copper silicate, cadmium green, chromium(III) oxide, copper(II) acetoarsenite, copper arsenite, arsenic sulfide, cadmium sulfide, lead(II) chromate, potassium cobaltinitrite, stannic sulfide, lead yellow, titanium yellow, cadmium orange, chrome orange, cadmium selenide, lead tetraoxide, mercuric sulfide, raw umber, raw sienna, carbon black, vine black, titanium black, zinc oxide, lead carbonate, lead hydroxide, barium sulfate, and antimony oxide.

Figure 2:
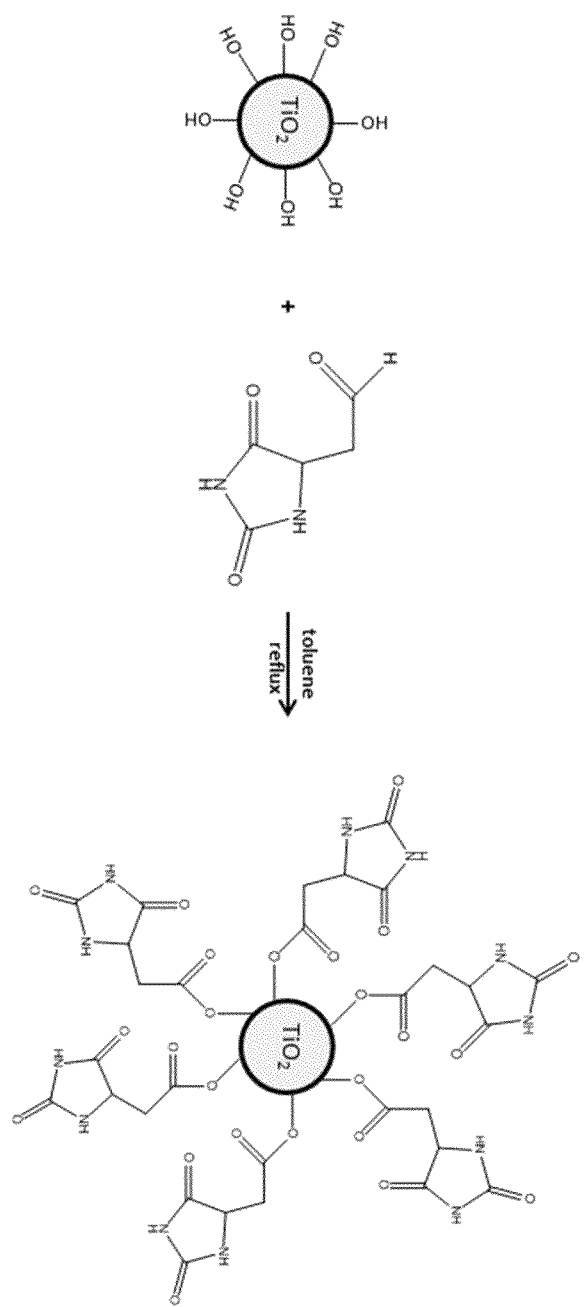
FIG. 2 depicts surface treatment of a titanium dioxide particle with hydantoin moieties according to an embodiment.

In some embodiments, the oxidizing agent may be attached to the surface of the inorganic pigment covalently. The inorganic pigments, such as metal oxides, usually contain hydroxyl groups on their surface due to some amount of moisture or water associated with it. The oxidizing agents may be attached by contacting the carboxyl group of the oxidizing agent with the hydroxyl group to form an ester. A Dean-Stark apparatus or any other equivalent reflux apparatus may be used for this process. In some embodiments, the oxidizing agent described herein is dissolved in a solvent that forms an azeotrope with water. Examples of such solvents include toluene, xylene, chloroform, and methylene chloride. Further, a small amount of catalyst such as p-toluene sulfonic acid may be included to facilitate the reaction. The reflux reaction may be performed from about 1 hour to about 10 hours, from about 1 hour to about 8 hours, from about 1 hour to about 6 hours, or from about 1 hour to about 5 hours. Specific examples include about 1 hour, about 1.5 hours, about 5 hours, about 6 hours, about 7.5 hours, about 8 hours, about 10 hours, and ranges between (and including the endpoints) any two of these values. The oxidizing agent and the inorganic pigment may be mixed in a weight to weight ratio of about 1:1000 to about 3:10, of about 1:1000 to about 1:10, or of about 1:1000 to about 1:100. Specific examples include about 1:1000, about 1:100, about 1:20, about 1:10, about 3:10, and ranges between any two of these values. After the reflux reaction, the mixture may be cooled to room temperature and the product may be filtered and dried. FIG. 2 illustrates the surface treatment of titanium dioxide particles with a hydantoin compound.

Figure 3:
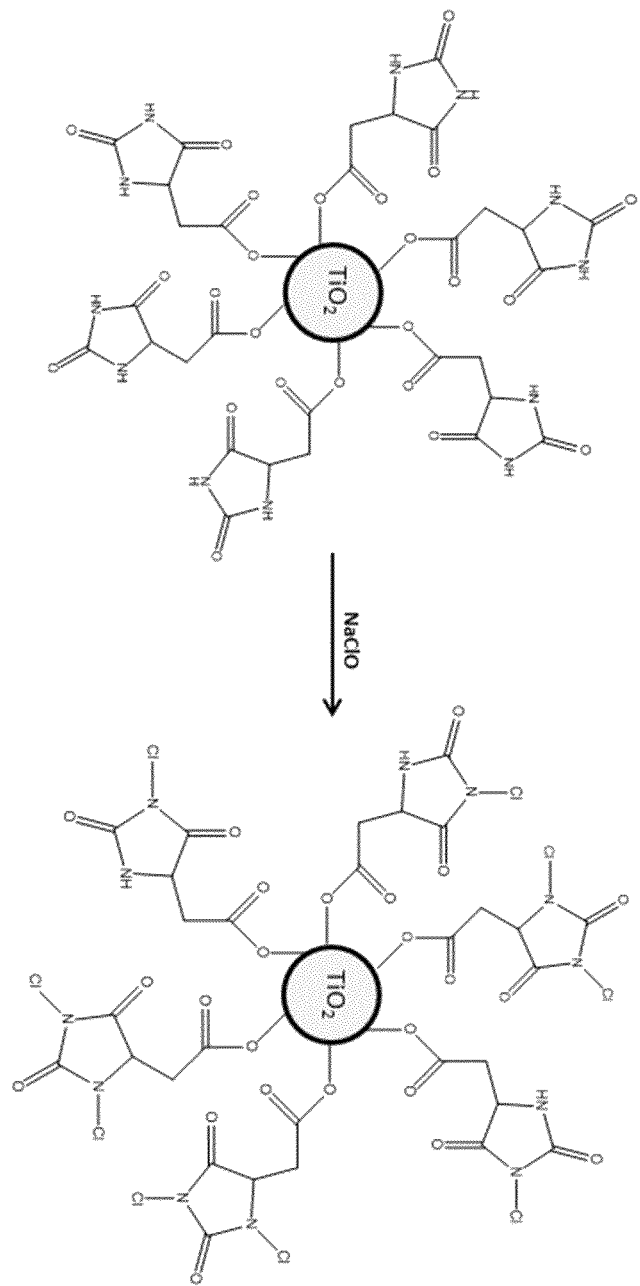
FIG. 3 shows halogenation of hydantoin molecules according to an embodiment.

The surface treated titanium dioxide particles may be further exposed to a hypochlorite solution, to form halogenated oxidizing agents. Halogenation of oxidizing agents increases their oxidizing properties. FIG. 3 illustrates an oxidizing agent, (2,5-dioxo-imidazolidin-4-yl)-acetic acid, and its subsequent chlorination using hypochlorous acid to form (3-dichloro-2,5 dioxo-imidozolidin-4-yl)-acetic acid. (3-Dichloro-2,5 dioxo-imidozolidin-4-yl)-acetic acid can further react with hypochlorous acid to form water and (1,3-dichloro-2,5 dioxo-imidozolidin-4-yl)-acetic acid. Other acids such as hypobromous acid or hypoiodous acid may also be used to halogenate the oxidizing agents. The halogenation can be completely reversible and renewable.

In some embodiments, the pigment composition may contain a linker moiety between the inorganic pigment and the oxidizing agent. The linker moiety may be a silane, an ester, an oxide, an ether, a germane, a stannane, a thio compound, a sulfate, a sulfonate, a sulfonyl compound, a seleno compound, a selenate, a selenonate, a selenonyl compound or a combination thereof.

Figure 4:
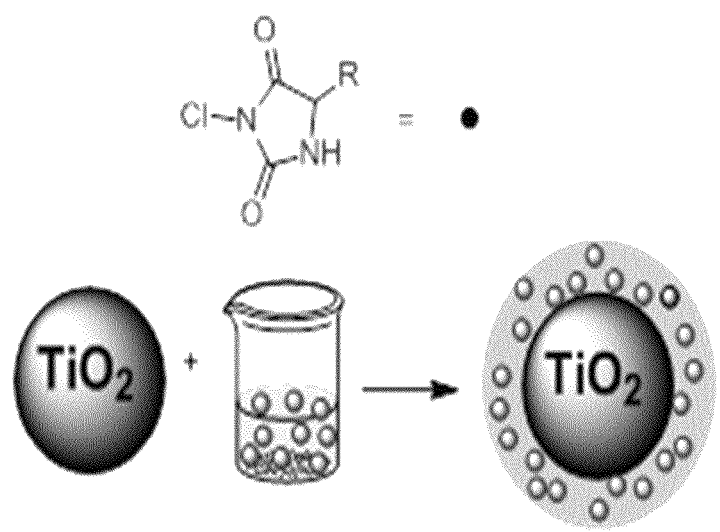
FIG. 4 depicts a titanium dioxide particle coated with tetraethylorthosilicate containing hydantoin molecules according to an embodiment.

In some embodiments, the oxidizing agent may be non-covalently associated with the surface of the inorganic pigment. For example, the oxidizing agent is dissolved in a hydrated oxide solution, and the solution is coated on the surface of the inorganic pigment. The hydrated oxide may be hydrated silicon dioxide, hydrated aluminum oxide, hydrated calcium oxide, hydrated zinc oxide, or hydrated magnesium oxide, or any mixture thereof. The oxidizing agent may also be incorporated in a sol-gel layer that surrounds the inorganic pigment. The sol-gel layer or coating may be prepared from any transition metal alkoxide. FIG. 4 illustrates one such embodiment. For example, the titanium dioxide particles are coated with tetraethylortho-silicate, and the oxidizing agent is incorporated in this coating.

The pigment material described herein may be dispersed in one or more organic binders, preferably a polymeric organic binder. In the broadest aspect, it is contemplated that any polymeric binder may be employed. In some embodiments, the polymeric binder is a water-dispersible polymer. The water-dispersible polymer may include a latex binder, such as natural latex, neoprene latex, nitrile latex, acrylic latex, vinyl acrylic latex, styrene acrylic latex, styrene butadiene latex, or the like. Compositions may include a single binder or a mixture of two or more polymeric binders that may be of the same class or different. For example, organic binders may be combined with a silicon-based binder.

In some embodiments, the pigment material may be dispersed in inorganic binders. Inorganic binders may include, without limitation, alkali metal silicates, such as potassium silicate, sodium silicate, lithium silicate or the like.

Paints and coatings of the present disclosure may contain one or more additives that alter the properties of the paint, such as shelf life, application and longevity, and health and safety. Such additives may be added, for example, during the manufacture of the emulsion polymer or during the formulation of the paint itself. Additives include initiators, rheology modifiers, preservatives, coalescing agents, stabilizers and the like. Initiators, such as persulfates, may be added to the coatings described herein. Initiators are a source of free radicals to initiate the polymerization process in which monomers condense to form the polymers. Coatings may also contain a redox system initiator, such as ferrous and thiosulfate mixtures along with the persulfate salts, that promote polymerization at room temperature.

In some embodiments, thickeners and rheology modifiers may be added to achieve the desired viscosity and flow properties. Thickeners function by forming multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the compositions.

In some embodiments, coalescing agents, such as ester alcohols, benzoate ethers, glycol ethers, glycol ether esters and n-methyl-2-pyrrolidone, may be added to the coating compositions. Coalescing agents are added, for example, to promote film formation under varying atmospheric conditions. They may be slow evaporating solvents with some solubility in the polymer phase. They may act as a temporary plasticizer, allowing film formation at temperatures below the system's glass transition temperature, after which they slowly diffuse to the surface and evaporate, increasing the hardness and block resistance of the film.

In some embodiments, preservatives and fungicides may be added in the coating compositions in low doses to protect against the growth of microorganisms. Preservatives, such as methyl benzisothiazolinones, chloromethylisothiazolinones, barium metaborate and 1-(3-chloroallyl)-3,5,7-triaza-1-azoniaadamantane chloride may be used.

In some embodiments, stabilizers, such as ethylene and propylene glycol, may be used. Stabilizers help to reduce or prevent formation of ice crystals at low temperatures in waterborne paints, thereby retaining the dispersion stability and reducing damage to the polymers.

In some embodiments, coatings of the present disclosure may further contain one or more of the following: solvents, pigments, plasticizers, surfactants and the like. Surfactants may be used, for example, to create the micelles for particle formation, as well as long-term particle stabilization and these provide stability through electrostatic and steric hindrance mechanisms. In some embodiments, ionic and nonionic surfactants may be used. Examples include, but are not limited to, alkyl phenol ethoxylates, sodium lauryl sulfate, dodecylbenzene sulfonate, polyoxyethylene alkyl ethers, polyoxyethylene alkyl allyl ethers, acetylene glycols, polyoxyethylene and polyoxypropylene.

In some embodiments, plasticizers may be added to the compositions to adjust the tensile properties of the paint film. Plasticizers may be, for example, glucose-based, glycerine-based, propylene glycol, ethylene glycol, phthalates and the like.

The coating compositions described herein may also include extenders or fillers that serve to thicken coating films and support the structure of the coating composition. Some extenders may also provide hiding power and function as pigments, particularly above the critical pigment volume concentration, and most extenders are color neutral. Common extenders include clays, such as kaolin clays, china clays, talcs, quartz, barytes (barium sulphate) and carbonate salts, such as calcium carbonate, zinc carbonate, magnesium carbonate or mixtures thereof.

A coating of the present disclosure may be applied to any substrate. The substrate may be an article, an object, a vehicle or a structure. Although no particular limitation is imposed on the substrate to be used in the present disclosure, glasses, plastics, metals, ceramics, wood, stones, cement, fabric, paper, leather, and combinations or laminations thereof may be used. The coating may be applied to a substrate by spraying, dipping, rolling, brushing, or any combination thereof.

Figure 5:
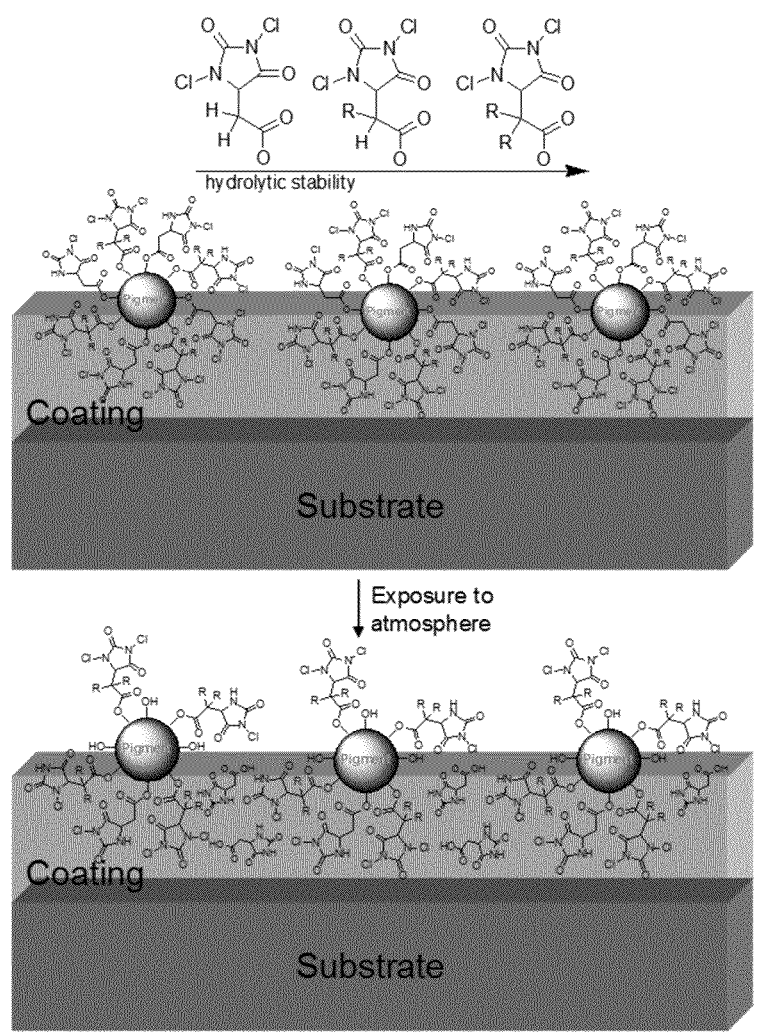
FIG. 5 depicts a coating containing titanium dioxide particles attached to oxidizing moieties and applied on a substrate according to an embodiment.

FIG. 5 illustrates a coating embodiment. When the coating is applied, the hydantoin-pigments are exposed at the surface and are also embedded throughout the coating. A new layer of functional pigments may be formed if the surface wears. Thus, the surface always remains self-cleaning. The constant self-cleaning allows the coating to provide excellent visual enhancement of the substrate with minimal labor. In addition, the coating may also provide excellent protection to the substrate. Due to the presence of organic binders, the coating may provide excellent adhesion to the substrate and reduce or prevent water, electrolytes, organics, and other contaminates from harming the substrates. A wide choice of organic binders may be used to impart excellent abrasion and chemical resistance properties to the coating. Further, the hydrolytic stability of the linker between the pigment and oxidizing agent linker may be adjusted for specific applications. For example, some applications may require a robust linkage while others may require the linkage to be cleaved only at the surface, but not within the bulk of the coating. This may be accomplished by the addition of organic groups (R) next to or in the vicinity of the ester bond. The organic group can be any methyl, ethyl, cyclo, or any other of organic molecule. The presence of organic groups may slow the rate of hydrolysis of the ester linkages. The organic moiety may protect the carbonyl group of the ester from water by steric effects, thus making it difficult for water to reach the linker site. Further, the organic moieties may also donate electron density to the carbonyl group and make it less susceptible to nucleophilic attack. The use of electron withdrawing groups such as fluorine can also make the oxidizing agent more prone to hydrolysis. Thus, the oxidizing agent can be regulated to cleave only at the coating surface while remaining attached to the pigment in the bulk of the coating.

The pigment composition disclosed herein may be used in combination with other pigments that are not attached to oxidizing agents. Thus, pigments attached to oxidizing agents may be included with pigments that are not attached to oxidizing agents during the manufacture of coatings. Such methods may be more economical in making coatings that have hydrophilic and self-cleaning properties.

EXAMPLES

Example 1

Preparation of Pigment Material

About 100 grams of commercially available titanium dioxide (average particle diameter of about 500 nanometers) are mixed with 10 grams of (2,5-dioxo-imidazolidin-4-yl)-acetic acid in 150 ml of toluene. The mixture is refluxed using a Dean-Stark apparatus in the presence of trace amount of p-toluene sulfonic acid for about 5 hours. At the end of this period, the mixture is cooled to room temperature and the product is filtered, washed with toluene and dried in a vacuum oven for 2 hours. The product is further treated with 0.1 N of sodium hypochlorite for 1 hour to obtain a final product of (1,3-dichloro-2,5 dioxo-imidozolidin-4-yl)-acetic acid moieties attached to titanium dioxide particles.

Example 2

Preparation of Pigment Material

About 100 grams of chromium oxide particles are mixed with 10 grams of (2,6-dioxo-piperidin-4-yl)-acetic acid in 150 ml of toluene. The mixture is refluxed using a Dean-Stark apparatus in the presence of trace amount of p-toluene sulfonic acid for about 5 hours. At the end of this period, the mixture is cooled to room temperature and the product is filtered, washed with toluene and dried in a vacuum oven for 2 hours. The product is further treated with 0.1 N of sodium hypochlorite for 1 hour to obtain a final product of (1-chloro-2,6-dioxo-piperidin-4-yl)-acetic acid attached to chromium oxide particles.

Example 3

Preparation of Pigment Material

About 100 grams of commercially available titanium dioxide particles (average particle diameter of about 500 nanometers) are dip coated with a solution containing 10 grams of (1,3-dichloro-2,5 dioxo-imidozolidin-4-yl)-acetic acid dissolved in 100 ml of tetraethylorthosilicate. The tetraethylorthosilicate coating on the particle is cured by slowly adding 10 grams of acetic acid under constant stirring. The particles are air dried overnight.

Example 4

Preparation of a Hydrophilic Coating

A hydrophilic coating is prepared having the following components: 40 grams of surface treated chromium oxide pigment (Example 2), 2 grams of thickener (hydroxyethyl cellulose), 150 grams of solvent (water), 70 grams of binder (methyl methacrylate), 0.3 grams of coalescing agent (2,2,4-trimethyl-1,3-pentanediolmono(2-methylpropanoate)), and 0.05 grams of bactericide. The components are mixed under high shear for 30 minutes.

Example 5

Evaluation of Hydrophilic Property

The hydrophilic coating containing modified titanium dioxide particles of Example 1 is coated on a glass surface and dried in an oven at 100° C. for 10 minutes. The surface free energy and the water droplet contact angle of the hydrophilic coating is measured as follows. A Zisman plotting method is employed for measuring surface free energy. The surface tension of various concentrations of the aqueous solution of magnesium chloride is plotted along the X-axis, and the contact angle in terms of cos θ is plotted along the Y-axis. A graph with a linear relationship between the two is obtained. The graph is extrapolated such that the surface tension at contact angle 0° is measured and is defined as the surface free energy of the solid. The surface free energy of the glass surface measured will be 85 milliNewton/meter.

Example 6

Measuring Self-Cleaning Properties

The self-cleaning properties of each paint sample are investigated based on their ability to degrade the organic dye methylene blue. As the dye is degraded to water, carbon dioxide, and nitrogen containing species, a loss of color is observed. This loss of color is monitored by measuring the brightness. The protocol is as follows: a film of paint is coated on a substrate such as a glass plate. The film thickness is similar to that used in the final application and generally not less than 25 microns thick when dry and the paint film is allowed to dry at least overnight. A solution of methylene blue in water (0.373 grams/L) is prepared and applied on the coated substrate and allowed to sit for about 60 minutes. The excess of methylene blue solution is removed and the substrate surface is dried and brightness value of the surface is measured. After 24 hours, the brightness value of the surface is re-measured. The brightness value will be 20% lesser than the initial value due to oxidation and degradation of the organic dye, thus demonstrating the self-cleaning power of the coating.

Example 7

An Object Coated with Hydrophilic Paint

A metal table is painted with a hydrophilic coating containing titanium dioxide particles attached to (1,3-dichcloro-2,5-dioxo-imidazolidin-4-yl)-acetic acid (Example 1) and is allowed to dry at room temperature. The surface free energy of the table is measured as explained in Example 5 and will be 85 milliNewton/meter. The anti-fouling property of the coating is measured as follows: A line is drawn on the coated table using an oily ink. A similar line is also drawn on a table which is not coated. A water jet is continuously applied on both the surfaces and periodically checked whether the oily line is erased. The oily ink applied on the coated table will be erased after 1 minute whereas the oily line on the un-coated table will still be present.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A pigment composition comprising an inorganic pigment attached or linked to an oxidizing agent selected from the group consisting of a hydantoin, a nitro, a nitroso, a triazine, an oxazolidinone, an imidazolidinone, and any combination thereof.

2. The pigment composition of claim 1, wherein the inorganic pigment is one or more of the following photocatalytic pigments: titanium dioxide, zinc oxide, copper oxide, hematite, magnetite, wüstite, chromium oxide, tin dioxide, and carbonate pigment.

3. The pigment composition of claim 1, wherein the inorganic pigment is iron oxide black, iron oxide red, iron oxide yellow, ultramarine, cobalt blue, cerulean blue, cobalt stannate, calcium copper silicate, ferric hexacyanoferrate, barium copper silicate, cadmium green, chromium(III) oxide, copper (II) acetoarsenite, copper arsenite, arsenic sulfide, cadmium sulfide, lead(II) chromate, potassium cobaltinitrite, stannic sulfide, lead yellow, titanium yellow, cadmium orange, chrome orange, cadmium selenide, lead tetraoxide, mercuric sulfide, raw umber, raw sienna, carbon black, vine black, titanium black, zinc oxide, lead carbonate, lead hydroxide, barium sulfate, antimony oxide, or a combination thereof.

4. The pigment composition of claim 1, wherein the inorganic pigment is a rutile titanium dioxide particle, an anatase titanium dioxide particle, or a mixture thereof.

5. The pigment composition of claim 1, wherein the inorganic pigment comprises particles of titanium dioxide coated with a hydrated oxide layer comprising at least one of hydrated silicon dioxide, hydrated aluminum oxide, hydrated calcium oxide, hydrated zinc oxide, hydrated magnesium oxide, or a mixture thereof.

6. The pigment composition of claim 5, wherein the oxidizing agent is present within the hydrated oxide layer.

7. The pigment composition of claim 1, wherein the inorganic pigment comprises particles of titanium dioxide coated with a layer of sol-gel made from a transition metal alkoxide.

8. The pigment composition of claim 7, wherein the oxidizing agent is present within the sol-gel layer.

9. The pigment composition of claim 1, wherein the inorganic pigment is a titanium dioxide particle with a plurality of linked (1,3-dichloro-2,5-dioxo-imidazolidin-4-yl)-acetic acid moieties.

10. The pigment composition of claim 1, wherein the inorganic pigment linked to the oxidizing agent comprises a linker molecule between the inorganic pigment and the oxidizing agent.

11. The pigment composition of claim 10, wherein the linker is a silane, an ester, an oxide, an ether, a germane, a stannane, a thio compound, a sulfate, a sulfonate, a sulfonyl compound, a seleno compound, a selenate, a selenonate, a selenonyl compound, or a combination thereof.

12. The pigment composition of claim 1, wherein the pigment composition is incorporated into a paint or a coating substance.

13. A method of preparing a pigment composition, the method comprising:
contacting an inorganic pigment with an oxidizing agent selected from the group consisting of a hydantoin, a nitro, a nitroso, a triazine, an oxazolidinone, an imidazolidinone, and any combination thereof, to form a mixture; and
heating the mixture to form the pigment composition.

14. The method of claim 13, wherein contacting the inorganic pigment with the oxidizing agent comprises contacting an inorganic pigment selected from rutile titanium dioxide particle, an anatase titanium dioxide particle, or a mixture thereof, with the oxidizing agent.

15. The method of claim 13, wherein contacting the inorganic pigment with the oxidizing agent comprises combining the inorganic pigment with the oxidizing agent in the presence of at least one solvent and at least one catalyst.

16. The method of claim 13, further comprising cooling the pigment composition to room temperature after the heating step.

17. The method of claim 13, further comprising filtering the pigment composition after the heating step.

18. The method of claim 17, further comprising contacting the pigment composition with a solution of hypochlorite after the filtering step.

19. A composition for forming a hydrophilic and self-cleaning coating, the composition comprising:
an inorganic pigment attached or linked to an oxidizing agent selected from the group consisting of a hydantoin, a nitro, a nitroso, a triazine, an oxazolidinone, an imidazolidinone, and any combination thereof; and
at least one binder component.

20. The composition of claim 19, wherein the inorganic pigment is titanium dioxide, zinc oxide, copper oxide, hematite, magnetite, wüstite, chromium oxide, tin dioxide, carbonate pigment, iron oxide black, iron oxide red, iron oxide yellow, ultramarine, cobalt blue, cerulean blue, cobalt stannate, calcium copper silicate, ferric hexacyanoferrate, barium copper silicate, cadmium green, chromium(III) oxide, copper (II) acetoarsenite, copper arsenite, arsenic sulfide, cadmium sulfide, lead(II) chromate, potassium cobaltinitrite, stannic sulfide, lead yellow, titanium yellow, cadmium orange, chrome orange, cadmium selenide, lead tetraoxide, mercuric sulfide, raw umber, raw sienna, carbon black, vine black, titanium black, lead carbonate, lead hydroxide, barium sulfate, antimony oxide, or a combination thereof.

21. The composition of claim 19, wherein the inorganic pigment is a rutile titanium dioxide particle, an anatase titanium dioxide particle, or a mixture thereof.

22. The composition of claim 19, wherein the inorganic pigment linked to the oxidizing agent comprises a linker molecule between the inorganic pigment and the oxidizing agent.

23. A method of providing a hydrophilic and self-cleaning surface to a substrate, the method comprising:
applying a coating composition to the substrate, wherein the coating composition comprises an inorganic pigment attached or linked to an oxidizing agent selected from the group consisting of a hydantoin, a nitro, a nitroso, a triazine, an oxazolidinone, an imidazolidinone, and any combination thereof.

24. The method of claim 23, wherein applying the coating composition to the substrate comprises applying a coating composition comprising an inorganic pigment selected from the group consisting of titanium dioxide, zinc oxide, copper oxide, hematite, magnetite, wüstite, chromium oxide, tin dioxide, carbonate pigment, iron oxide black, iron oxide red, iron oxide yellow, ultramarine, cobalt blue, cerulean blue, cobalt stannate, calcium copper silicate, ferric hexacyanoferrate, barium copper silicate, cadmium green, chromium(III) oxide, copper(II) acetoarsenite, copper arsenite, arsenic sulfide, cadmium sulfide, lead(II) chromate, potassium cobaltinitrite, stannic sulfide, lead yellow, titanium yellow, cadmium orange, chrome orange, cadmium selenide, lead tetraoxide, mercuric sulfide, raw umber, raw sienna, carbon black, vine black, titanium black, zinc oxide, lead carbonate, lead hydroxide, barium sulfate, antimony oxide, and any combination thereof.

25. The method of claim 23, wherein applying the coating composition to the substrate comprises applying a coating composition comprising an inorganic pigment selected from rutile titanium dioxide particle, an anatase titanium dioxide particle, and a mixture thereof.

26. The method of claim 23, wherein applying the coating composition to the substrate comprises applying a coating composition comprising a linker molecule between the inorganic pigment and the oxidizing agent.

* * * * *

UNITED STATES PATENT AND TRADEMARK OFFICE
CERTIFICATE OF CORRECTION

| | | |
|---|---|---|
| PATENT NO. | : 9,023,146 B2 | Page 1 of 1 |
| APPLICATION NO. | : 13/819745 | |
| DATED | : May 5, 2015 | |
| INVENTOR(S) | : Carlson et al. | |

It is certified that error appears in the above-identified patent and that said Letters Patent is hereby corrected as shown below:

In the specification

In Column 1, Line 6, delete "U.S.C. §371" and insert -- U.S.C. § 371 --, therefor.

In the claims

In Column 12, Line 41, in Claim 44, delete "zinc oxide, lead carbonate," and insert -- lead carbonate, --, therefor.

Signed and Sealed this
Twentieth Day of October, 2015

Michelle K. Lee
*Director of the United States Patent and Trademark Office*